(12) United States Patent
Zeng et al.

(10) Patent No.: US 10,250,506 B2
(45) Date of Patent: Apr. 2, 2019

(54) LINK CONTROL METHOD AND APPARATUS

(71) Applicant: Sanechips Technology Co.,Ltd., Shenzhen, Guangdong (CN)

(72) Inventors: Min Zeng, Shenzhen (CN); Liuqin Xie, Shenzhen (CN); Youliang Zhang, Shenzhen (CN); Hengqi Liu, Shenzhen (CN)

(73) Assignee: Sanechips Technology Co. Ltd., Shenzhen, Guangdong (CN)

(*) Notice: Subject to any disclaimer, the term of this patent is extended or adjusted under 35 U.S.C. 154(b) by 0 days.

(21) Appl. No.: 15/519,666

(22) PCT Filed: Apr. 9, 2015

(86) PCT No.: PCT/CN2015/076156
§ 371 (c)(1),
(2) Date: Apr. 17, 2017

(87) PCT Pub. No.: WO2016/062024
PCT Pub. Date: Apr. 28, 2016

(65) Prior Publication Data
US 2018/0145912 A1 May 24, 2018

(30) Foreign Application Priority Data
Oct. 22, 2014 (CN) .......................... 2014 1 0567855

(51) Int. Cl.
*H04L 12/801* (2013.01)
*H04L 12/729* (2013.01)
*H04L 12/933* (2013.01)

(52) U.S. Cl.
CPC ............ *H04L 47/12* (2013.01); *H04L 45/125* (2013.01); *H04L 49/15* (2013.01); *H04L 49/1515* (2013.01)

(58) Field of Classification Search
CPC ....... H04L 47/12; H04L 45/125; H04L 49/15; H04L 49/1515
(Continued)

(56) References Cited

U.S. PATENT DOCUMENTS 5,450,074 A 9/1995 Yoshifuji
6,144,635 A 11/2000 Nakagawa
(Continued)

FOREIGN PATENT DOCUMENTS

CN 101179453 A 5/2008
CN 101631070 A 1/2010
(Continued)

OTHER PUBLICATIONS

International Search Report in international application No. PCT/CN2015/076156, dated Jul. 23, 2015, 2 pgs.
(Continued)

*Primary Examiner* — Mark H Rinehart
*Assistant Examiner* — Kokou R Detse
(74) *Attorney, Agent, or Firm* — Cooper Legal Group, LLC

(57) ABSTRACT

Disclosed are a link control method and apparatus. The method includes that: link information and/or machine frame information in a system is acquired; and link control is performed according to the acquired link information and/or machine frame information. According to the technical solutions described in the disclosure, the problems of local congestion and packet loss in a three-level asymmetrical switching system can be effectively solved, the traffic level of the system is ensured, and the performance of the system is improved.

8 Claims, 7 Drawing Sheets

(58) Field of Classification Search
USPC .......................................................... 370/325
See application file for complete search history.

(56) References Cited

U.S. PATENT DOCUMENTS

| | | | |
|---|---|---|---|
| 8,447,902 | B2 | 5/2013 | Frank |
| 2007/0041321 | A1 | 2/2007 | Sasaki |
| 2010/0061238 | A1 | 3/2010 | Godbole |
| 2010/0061239 | A1 | 3/2010 | Godbole |
| 2010/0061240 | A1 | 3/2010 | Sindhu |
| 2010/0061241 | A1 | 3/2010 | Sindhu |
| 2010/0061242 | A1 | 3/2010 | Sindhu |
| 2010/0061367 | A1 | 3/2010 | Sindhu |
| 2010/0061389 | A1 | 3/2010 | Sindhu |
| 2010/0061390 | A1 | 3/2010 | Godbole |
| 2010/0061391 | A1 | 3/2010 | Sindhu |
| 2010/0061394 | A1 | 3/2010 | Sindhu |
| 2010/0158031 | A1 | 6/2010 | Thomas |
| 2010/0165983 | A1 | 7/2010 | Aybay |
| 2010/0165984 | A1 | 7/2010 | Aybay |
| 2012/0195203 | A1 | 8/2012 | Godbole |
| 2012/0269065 | A1 | 10/2012 | Godbole |
| 2012/0275307 | A1 | 11/2012 | Godbole |
| 2013/0003726 | A1 | 1/2013 | Sindhu |
| 2013/0121343 | A1 | 5/2013 | Thomas et al. |
| 2015/0163171 | A1 | 6/2015 | Sindhu et al. |
| 2015/0172196 | A1 | 6/2015 | Godbole et al. |

FOREIGN PATENT DOCUMENTS

| | | | |
|---|---|---|---|
| CN | 101917331 | A * | 12/2010 |
| CN | 101917331 | A | 12/2010 |
| CN | 102238072 | A | 11/2011 |
| CN | 102281192 | A | 12/2011 |
| JP | H1032585 | A | 2/1998 |

OTHER PUBLICATIONS

English Translation of the Written Opinion of the International Search Authority in international application No. PCT/CN2015/076156, dated Jul. 23, 2015, 5 pgs.

* cited by examiner

LINK CONTROL METHOD AND APPARATUS

TECHNICAL FIELD

The disclosure relates to packet data switching and in particular to a link control method and apparatus.

BACKGROUND

A switching system is a key part of a packet switching apparatus, and is composed of a switching access unit and a switching unit. The switching access unit is composed of a source switching access unit and a destination switching access unit. The source switching access unit switches a data packet into a cell, and the destination switching access unit regroups the cell into the data packet. The switching unit takes charge of forwarding and switching the cell. Generally, there are multiple switching access units and multiple switching units in the system.

FIG. 1 is a schematic diagram illustrating connections of a three-level switching system. As shown in FIG. 1, the three-level switching system includes four service machine frames and a central machine frame. The four service machine frames are respectively service machine frame 1, service machine frame 2, service machine frame 3 and service machine frame 4. In FIG. 1, the switching unit on the service machine frame is called a service switching unit, and the switching unit on the central machine frame is called a central switching unit. The switching access unit and the service switching unit are interconnected through a high-speed serial link, so are the service switching unit and the central switching unit. The switching access unit is composed of the source switching access unit and the destination switching access unit. The source switching access unit receives a data packet from the outside and switches the data packet into a cell to send the same to the switching unit. The destination switching access unit receives the cell from the switching unit, and regroups the cell into the data packet to send the same to the outside. The service switching unit is composed of a first-level switching unit and a third-level switching unit. The first-level switching unit receives the cell from the source switching access unit and then forwards it to the central switching unit. The third-level switching unit receives the cell from the central switching unit and then forwards it to the destination switching unit. Because both the source switching access unit and the destination switching access unit are in the switching access unit, the source switching access unit and the destination switching access unit have internal buses to share information. Likewise, because both the first-level switching unit and the third-level switching unit are in the service switching unit, the first-level switching unit and the third-level switching unit have the internal buses to share information.

FIG. 2 is a schematic diagram illustrating data flows in a three-level switching system. As shown in FIG. 2, according to the direction of data flows from the source switching access unit on the service machine frame 1 to the destination switching access unit on the service machine frame 2, the cell sent by the source switching access unit on the service machine frame 1 reaches the central machine frame through the first-level switching unit on the service machine frame 1, further reaches the third-level switching unit on the service machine frame 2 through the switching unit on the central machine frame, and finally reaches each destination switching access unit on the service machine frame 2 through the switching of the third-level switching unit on the service machine frame 2. Generally, the switching unit on the central machine frame is also called a second-level switching unit, that is, there are three levels of switching units in the system.

The switching access unit and the service switching unit as well as the service switching unit and the central switching unit are interconnected through the high-speed serial links, such as the links 1 and the links 2 in FIGS. 1 and 2. These high-speed links are bidirectional links. According to the flow direction of data, the data is from the source switching access unit to the destination switching access unit.

An asymmetrical switching system means that the bandwidth in the switching unit is inconsistent for a certain destination switching access unit, which may cause long-existing local congestion in the switching unit and traffic reduction of the whole network. Packet loss may occur when the congestion is serious, so the performance of the system degrades.

SUMMARY

In view of this, in order to solve the existing technical problems, the disclosure provides the following technical solutions.

A link control method is applied to a three-level switching system, and includes that:

link information and/or machine frame information in the system is acquired; and link control is performed according to the acquired link information and/or machine frame information.

In a specific embodiment, for a third-level switching unit, the step that the link information and/or machine frame information in the system is acquired includes that:

connection relations and link rates of input links of the third-level switching unit, and connection relations and link rates of output links of the third-level switching unit are acquired;

the step that the link control is performed according to the acquired link information and/or machine frame information includes that:

a current input bandwidth value K is calculated according to $K=K+K_i$, the initial value of K is 0, $K_i$ is the link rate of the ith input link of the third-level switching unit, wherein $i=1, 2, \ldots, n$, and n is the number of input links of the third-level switching unit;

it is determined whether the value of K is not greater than the total output bandwidth of the third-level switching unit; if so, information indicating that a destination switching access unit can be reached is sent to a second-level switching unit corresponding to the ith input link, $i=i+1$, the value of K is recalculated, and it is continued to determine whether the value of K is not greater than the total output bandwidth of the third-level switching unit; the cycle is repeated; or else, information indicating that the destination switching access unit cannot be reached is sent to the second-level switching unit corresponding to the ith input link, the (i+1)th input link, ..., and the nth input link, wherein the total output bandwidth of the third-level switching unit is the sum of link rates of all output links of the third-level switching unit.

In a specific embodiment, for the second-level switching unit, the step that the link information and/or machine frame information in the system is acquired includes that:

the connection relations and link rates of the input links of the second-level switching unit, the connection relations and link rates of the output links of the second-level switching unit, and the composition of service machine frames in link connection with the second-level switching unit are acquired;

the step that the link control is performed according to the acquired link information and/or machine frame information includes that:

an input bandwidth value Kt from a source service machine frame t is calculated according to $Kt=Kt+Kti$; the initial value of Kt is 0, Kti is the link rate of the ith input link in the second-level switching unit from the source service machine frame t, wherein $i=1, 2, \ldots, n$, $t=1, 2, \ldots, m$, n is the number of input links in the second-level switching unit from the source service machine frame t, and m is the number of the source service machine frames in link connection with the second-level switching unit;

it is determined whether the value of Kt is not greater than the output bandwidth from the second-level switching unit to the service machine frame where the destination switching unit h is; if so, the information indicating that the destination switching access unit h can be reached is sent to a first-level switching unit corresponding to the ith input link from the source service machine frame t, $i=i+1$; the value of K is recalculated, and it is continued to determine whether the value of Kt is not greater than the output bandwidth from the second-level switching unit to the service machine frame where the destination switching unit h is, and the cycle is repeated; or else, the information indicating that the destination switching access unit h cannot be reached is sent to the first-level switching unit corresponding to the ith input link, the (i+1)th input link, . . . , and the nth input link from the source service machine frame t; after traversing all the input links from the source service machine frame t, $t=t+1$, $i=1$, the value of Kt is recalculated, and it is continued to determine whether the value of Kt is not greater than the output bandwidth from the second-level switching unit to the service machine frame where the destination switching unit h is, wherein the output bandwidth from the second-level switching unit to the service machine frame where the destination switching unit h is refers to the sum of link rates of all the output links from the second-level switching unit to the destination switching unit h; and after traversing all the source service machine frames in link connection with the second-level switching unit, $h=h+1$, $t=1$, and $i=1$, the above steps are repeated so as to perform the link control.

In a specific embodiment, the step that the link control is performed according to the acquired link information and/or machine frame information includes that:

the link control is performed on the switching unit by polling and/or according to the acquired link information and/or machine frame information when the output link of the switching unit fails.

The disclosure also provides a link control apparatus, applied to the three-level switching system, and including: an acquiring module and a link control module.

The acquiring module is arranged to acquire the link information and/or machine frame information in the system.

The link control module is arranged to perform the link control according to the acquired link information and/or machine frame information.

In a specific embodiment, the link control module includes a first calculating submodule, a first determining submodule and a first sending submodule.

The acquiring module is specifically arranged to acquire the connection relations and link rates of the input links of the third-level switching unit, and the connection relations and link rates of the output links of the third-level switching unit.

The first calculating submodule is arranged to calculate the current input bandwidth value K according to $K=K+Ki$; the initial value of K is 0, Ki is the link rate of the ith input link of the third-level switching unit, wherein $i=1, 2, \ldots, n$, and n is the number of input links of the third-level switching unit; the first calculating submodule is further arranged to determine $i=i+1$ again according to the notification from the first sending submodule, and recalculate the value of K.

The first determining submodule is arranged to determine whether the value of K is not greater than the total output bandwidth of the third-level switching unit, wherein the total output bandwidth of the third-level switching unit is the sum of link rates of all the output links of the third-level switching unit.

The first sending submodule is arranged to, when the first determining submodule determines the value of K is not greater than the total output bandwidth of the third-level switching unit, send the information indicating that the destination switching access unit can be reached to the second-level switching unit corresponding to the ith input link, and notify the first calculating submodule; the first sending submodule is further arranged to, when the first determining submodule determines the value of K is greater than the total output bandwidth of the third-level switching unit, send the information indicating that the destination switching access unit cannot be reached to the second-level switching unit corresponding to the ith input link, the (i+1)th input link, . . . , and the nth input link.

In a specific embodiment, the link control module includes a second calculating submodule, a second determining submodule and a second sending submodule.

The acquiring module is specifically arranged to acquire the connection relations and link rates of the input links of the second-level switching unit, the connection relations and link rates of the output links of the second-level switching unit, and the composition of the service machine frames in link connection with the second-level switching unit.

The second calculating submodule is arranged to calculate the input bandwidth value Kt from the source service machine frame t according to $Kt=Kt+Kti$; the initial value of Kt is 0, Kti is the link rate of the ith input link in the second-level switching unit from the source service machine frame t, wherein $i=1, 2, \ldots, n$, $t=1, 2, \ldots, m$, n is the number of input links in the second-level switching unit from the source service machine frame t, and m is the number of the source service machine frames in link connection with the second-level switching unit; the second calculating submodule is further arranged to, after the second sending submodule sends the information indicating that the destination switching access unit h can be reached to the first-level switching unit corresponding to the ith input link from the source service machine frame t, $i=i+1$, recalculate the value of Kt, and after traversing all the input links from the source service machine frame t, $t=t+1$, $i=1$, recalculate the value of Kt, and after traversing all the source service machine frames in link connection with the second-level switching unit, $h=h+1$, $t=1$, and $i=1$, recalculate the value of Kt.

The second determining submodule is arranged to determine whether the value of Kt calculated by the second calculating submodule is not greater than the output bandwidth from the second-level switching unit to the service machine frame where the destination switching unit h is; wherein the output bandwidth from the second-level switching unit to the service machine frame where the destination switching unit h is refers to the sum of link rates of all the output links from the second-level switching unit to the destination switching unit h.

The second sending submodule is arranged to, when the second determining submodule determines the value of Kt is not greater than the output bandwidth from the second-level switching unit to the service machine frame where the destination switching unit h is, send the information indicating that the destination switching access unit h can be reached to the first-level switching unit corresponding to the ith input link from the source service machine frame t, and when the second determining submodule determines the value of Kt is greater than the output bandwidth from the second-level switching unit to the service machine frame where the destination switching unit h is, send the information indicating that the destination switching access unit h cannot be reached to the first-level switching unit corresponding to the ith input link, the (i+1)th input link, . . . , and the nth input link from the source service machine frame t.

In a specific embodiment, the apparatus further includes a triggering module arranged to trigger the link control module to perform the link control by polling and/or when the output link of the switching unit fails.

The acquiring module, the link control module, the first calculating submodule, the first determining submodule, the first sending submodule, the second calculating submodule, the second determining submodule and the second sending submodule can be realized by a Central processing Unit (CPU), a Digital Signal Processor (DSP), or a Field-Programmable Gate Array (FPGA) during processing.

According to the link control method and apparatus provided by the disclosure, the link information and/or machine frame information in the system is acquired, and the link control is performed according to the acquired link information and/or machine frame information. According to the technical solutions described in the disclosure, the problems of local congestion and packet loss in a three-level asymmetrical switching system can be effectively solved, the traffic level of the system is ensured, and the performance of the system is improved.

DETAILED DESCRIPTION

Figure 1:
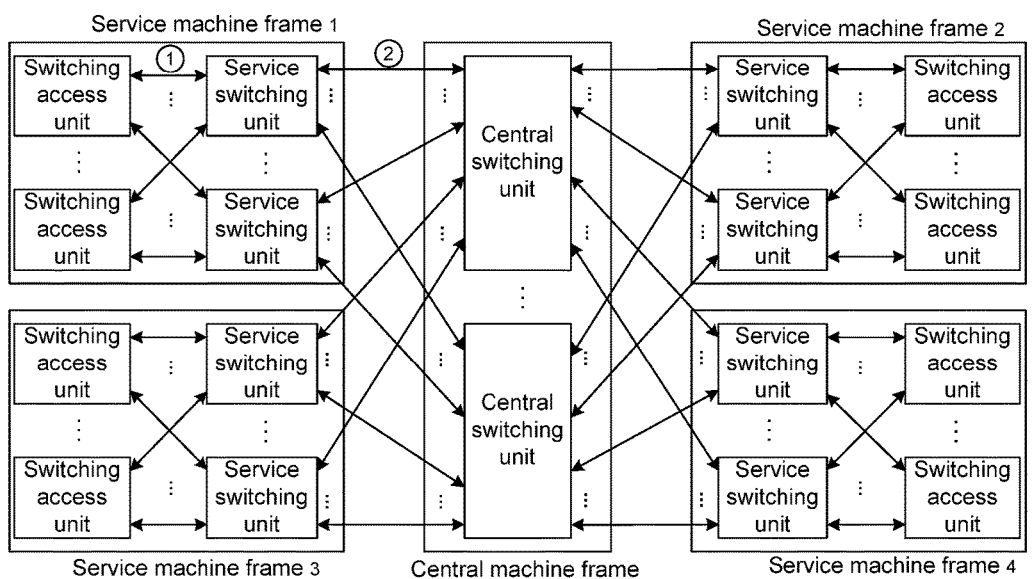
FIG. 1 is a schematic diagram illustrating connections of a three-level switching system.
Figure 2:
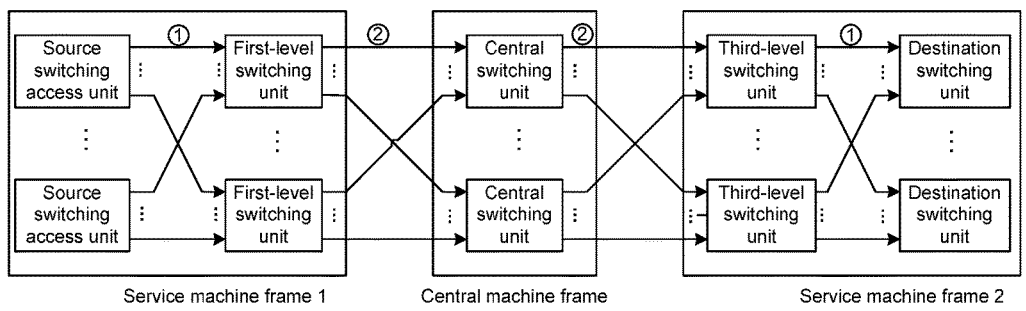
FIG. 2 is a schematic diagram illustrating data flows in a three-level switching system.
Figure 3:
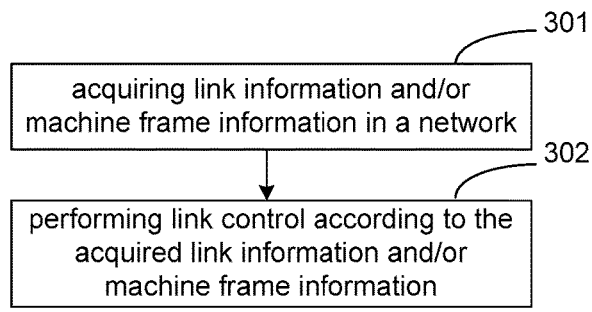
FIG. 3 is a flowchart showing a link control method according to an embodiment of the disclosure.

In order to solve the problems of local congestion and packet loss in a three-level asymmetrical switching system, the embodiments of the disclosure provide a link control method, which is applied to a three-level switching system. As shown in FIG. 3, the method includes the following steps.

At Step 301, link information and/or machine frame information in the system is acquired.

Note that, the link information of all links and/or machine frame information in the system may be acquired. Alternatively, the link information of a pre-set part of links and/or machine frame information may be only acquired.

At Step 302, link control is performed according to the acquired link information and/or machine frame information.

Figure 4:
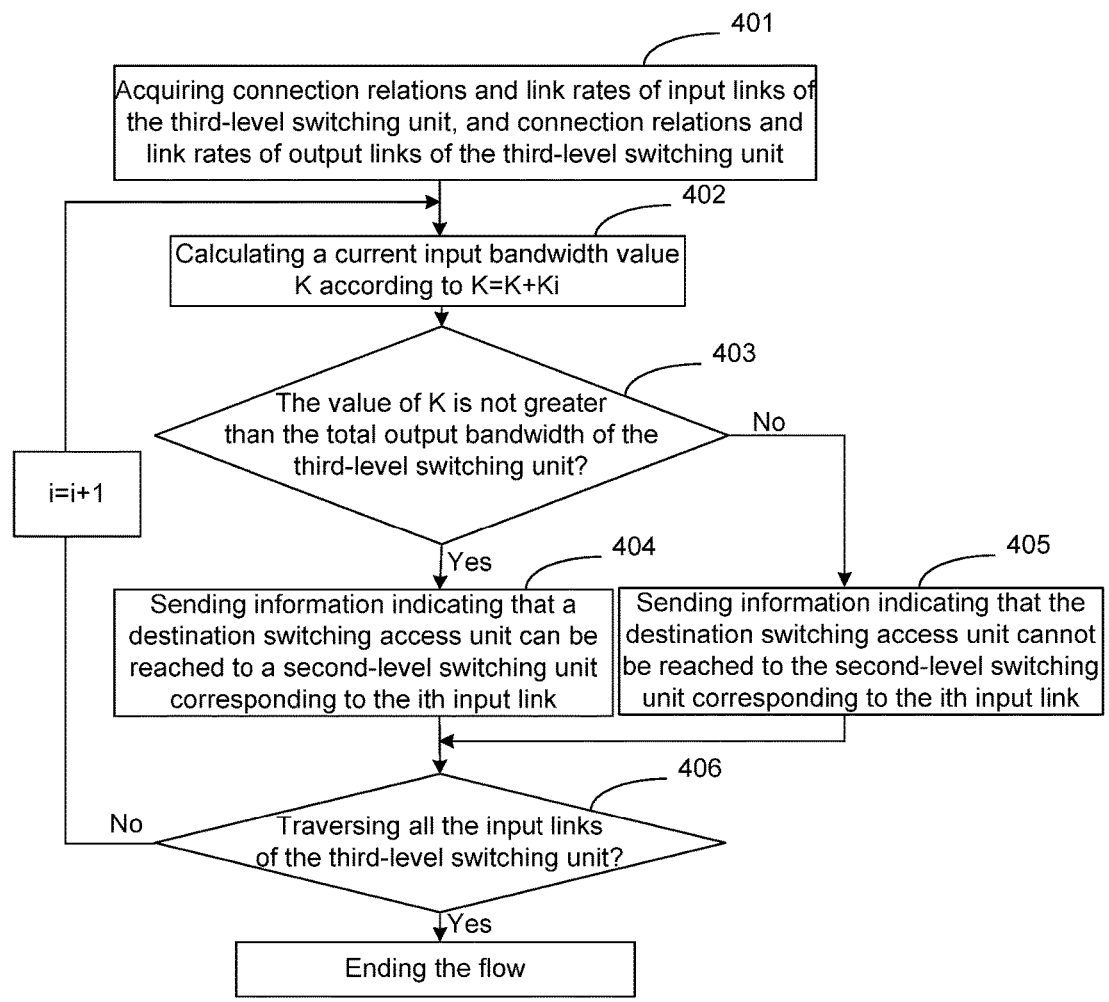
FIG. 4 is a flowchart showing another link control method according to an embodiment of the disclosure.

In a specific embodiment, for a third-level switching unit, as shown in FIG. 4, the method includes the following steps.

At Step 401, connection relations and link rates of input links of the third-level switching unit, and connection relations and link rates of output links of the third-level switching unit are acquired.

At Step 402, a current input bandwidth value K is calculated according to $K=K+Ki$.

Herein, the initial value of K is 0, Ki is the link rate of the ith input link of the third-level switching unit, wherein i=1, 2, . . . , n, and n is the number of input links of the third-level switching unit.

At Step 403, it is determined whether the value of K is not greater than the total output bandwidth of the third-level switching unit; if so, Step 404 is performed; or else, Step 405 is performed.

Here, the total output bandwidth of the third-level switching unit is the sum of link rates of all output links of the third-level switching unit.

At Step 404, information indicating that a destination switching access unit can be reached is sent to a second-level switching unit corresponding to the ith input link; and then it goes to Step 406.

At Step 405, information indicating that a destination switching access unit cannot be reached is sent to the second-level switching unit corresponding to the ith input link.

Note that, this step is equivalent to sending the information indicating that the destination switching access unit cannot be reached to the second-level switching unit corresponding to the ith input link, the (i+1)th input link, . . . , and the nth input link.

At Step 406, it is determined whether to traverse all the input links of the third-level switching unit; if so, the flow ends; or else, i=i+1, and then it returns to Step 402.

Note that, when the link control is performed, the superposition order of input bandwidths can be determined according to a pre-set order, or randomly, or according to a descending or ascending order of the link rates.

Figure 5:
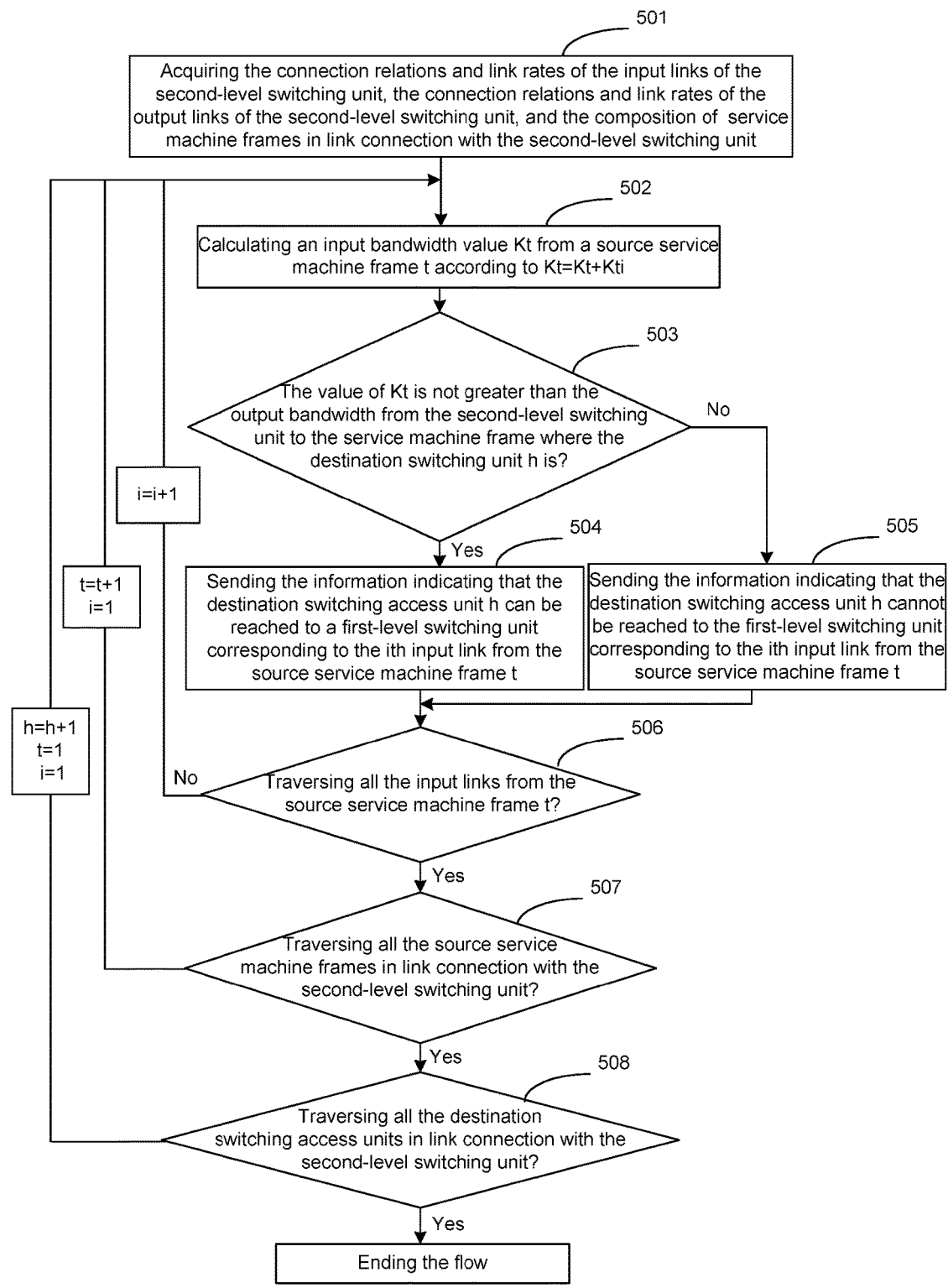
FIG. 5 is a flowchart showing still another link control method according to an embodiment of the disclosure.

In a specific embodiment, for the second-level switching unit, as shown in FIG. 5, the method includes the following steps.

At Step 501, the connection relations and link rates of the input links of the second-level switching unit, the connection relations and link rates of the output links of the second-level switching unit, and the composition of service machine frames in link connection with the second-level switching unit are acquired.

At Step 502, an input bandwidth value Kt from a source service machine frame t is calculated according to Kt=Kt+Kti.

Herein, the initial value of Kt is 0, Kti is the link rate of the ith input link in the second-level switching unit from the source service machine frame t, wherein i=1, 2, . . . , n, t=1, 2, . . . , m, n is the number of input links in the second-level switching unit from the source service machine frame t, and m is the number of the source service machine frames in link connection with the second-level switching unit.

At Step 503, it is determined whether the value of Kt is not greater than the output bandwidth from the second-level switching unit to the service machine frame where the destination switching unit h is; if so, Step 504 is performed; or else, Step 505 is performed.

The output bandwidth from the second-level switching unit to the service machine frame where the destination switching unit h is refers to the sum of link rates of all the output links from the second-level switching unit to the destination switching unit h.

At Step 504, the information indicating that the destination switching access unit h can be reached is sent to a first-level switching unit corresponding to the ith input link from the source service machine frame t, and Step 506 is performed.

At Step 505, the information indicating that the destination switching access unit h cannot be reached is sent to the first-level switching unit corresponding to the ith input link from the source service machine frame t, and Step 506 is performed.

This step applies for sending the information indicating that the destination switching access unit h cannot be reached to the first-level switching unit corresponding to the ith input link, the (i+1)th input link, . . . , and the nth input link from the source service machine frame t, respectively.

At Step 506, it is determined whether to traverse all the input links from the source service machine frame t; if so, t=t+1, i=1, and return to Step 502; or else, i=i+1, and return to Step 502.

At Step 507, it is determined whether to traverse all the source service machine frames in link connection with the second-level switching unit; if so, the flow ends; or else, t=t+1, i=1, and return to Step 502.

At Step 508, it is determined whether to traverse all the destination switching access units in link connection with the second-level switching unit; if so, the flow ends; or else, h=h+1, t=1, i=1, and return to Step 502.

Optionally, in a specific embodiment, the step that the link control is performed according to the acquired link information and/or machine frame information includes that:

the link control is performed on the switching unit by polling and/or according to the acquired link information and/or machine frame information when the output link of the switching unit fails.

The embodiment of the disclosure, which is mainly applied to a three-level asymmetrical switching system in packet data switching, solves the problems of local congestion, bandwidth waste and packet loss caused by asymmetry in a three-level switching system, and improves the performance of the switching system.

Figure 6:
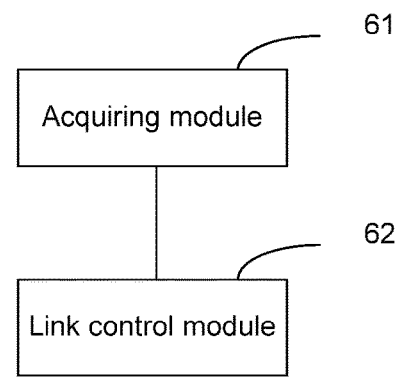
FIG. 6 is structure diagram illustrating a link control apparatus according to an embodiment of the disclosure.

The embodiment of the disclosure also provides a link control apparatus correspondingly, which is applied to the three-level switching system. As shown in FIG. 6, the apparatus includes an acquiring module 61 and a link control module 62.

The acquiring module 61 is arranged to acquire the link information and/or machine frame information in the system.

The link control module 62 is arranged to perform the link control according to the acquired link information and/or machine frame information.

Figure 7:
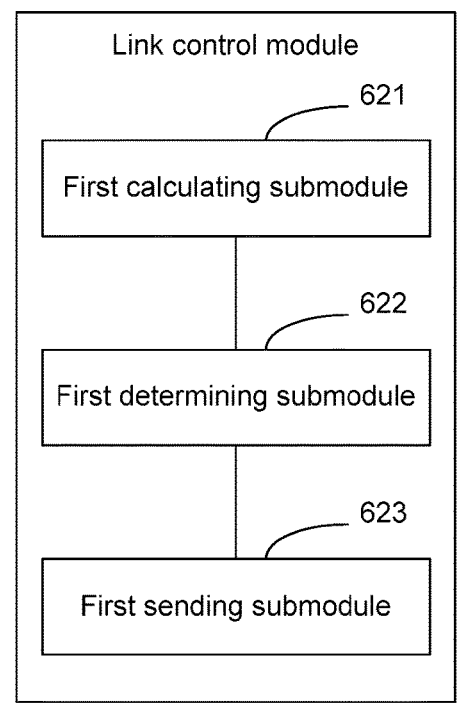
FIG. 7 is structure diagram illustrating a link control module 62 according to an embodiment of the disclosure.

In a specific embodiment, as shown in FIG. 7, the link control module 62 includes a first calculating submodule 521, a first determining submodule 622 and a first sending submodule 623.

The acquiring module 61 is specifically arranged to acquire the connection relations and link rates of the input links of the third-level switching unit, and the connection relations and link rates of the output links of the third-level switching unit.

The first calculating submodule 621 is arranged to calculate the current input bandwidth value K according to K=K+Ki, and determine i=i+1 again according to the notification from the first sending submodule, and recalculate the value of K, the initial value of K being 0, Ki being the link rate of the ith input link of the third-level switching unit, wherein i=1, 2, . . . , n, and n being the number of input links of the third-level switching unit.

The first determining submodule 622 is arranged to determine whether the value of K calculated by the first calculating submodule 621 is not greater than the total output bandwidth of the third-level switching unit, wherein the total output bandwidth of the third-level switching unit is the sum of link rates of all the output links of the third-level switching unit.

The first sending submodule 623 is arranged to, when the first determining submodule 622 determines the value of K is not greater than the total output bandwidth of the third-level switching unit, send the information indicating that the destination switching access unit can be reached to the second-level switching unit corresponding to the ith input link, and notify the first calculating submodule; the first sending submodule 623 is further arranged to, when the first determining submodule 622 determines the value of K is greater than the total output bandwidth of the third-level switching unit, send the information indicating that the destination switching access unit cannot be reached to the second-level switching unit corresponding to the ith input link, the (i+1)th input link, . . . , and the nth input link.

Figure 8:
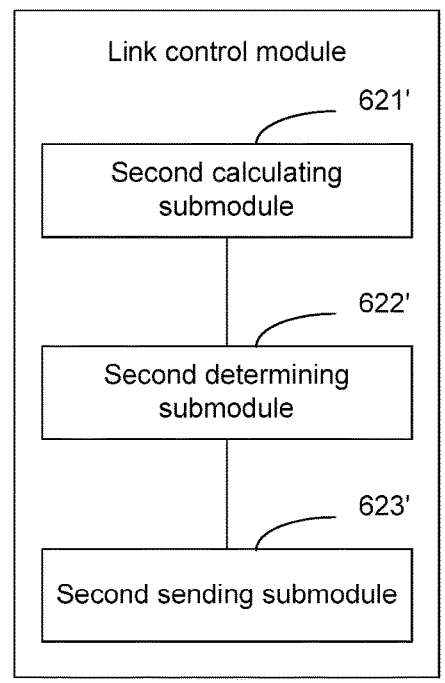
FIG. 8 is structure diagram illustrating another link control module 62 according to an embodiment of the disclosure.

In a specific embodiment, as shown in FIG. 8, the link control module includes a second calculating submodule 621', a second determining submodule 622' and a second sending submodule 623'.

The acquiring module 61 is specifically arranged to acquire the connection relations and link rates of the input links of the second-level switching unit, the connection relations and link rates of the output links of the second-level switching unit, and the composition of the service machine frames in link connection with the second-level switching unit.

The second calculating submodule 621' is arranged to calculate the input bandwidth value Kt from the source service machine frame t according to Kt=Kt+Kti; the initial value of Kt is 0, Kti is the link rate of the ith input link from the source service machine frame t of the second-level switching unit, wherein i=1, 2, . . . , n, t=1, 2, . . . , m, n is the number of input links from the source service machine frame t of the second-level switching unit, and m is the number of the source service machine frames in link connection with the second-level switching unit. The second calculating submodule 621' is further arranged to, after the second sending submodule sends the information indicating that the destination switching access unit h can be reached to the first-level switching unit corresponding to the ith input link from the source service machine frame t, make i=i+1 and recalculate the value of Kt; after traversing all the input links from the source service machine frame t, make t=t+1, i=1 and recalculate the value of Kt, and after traversing all the source service machine frames in link connection with the second-level switching unit, make h=h+1, t=1, and i=1, and recalculate the value of Kt.

The second determining submodule 622' is arranged to determine whether the value of Kt calculated by the second calculating submodule is not greater than the output bandwidth from the second-level switching unit to the service machine frame where the destination switching unit h is; wherein the output bandwidth from the second-level switching unit to the service machine frame where the destination switching unit h is refers to the sum of link rates of all the output links from the second-level switching unit to the destination switching unit h.

The second sending submodule 623' is arranged to, when the second determining submodule 622' determines the value of Kt is not greater than the output bandwidth from the second-level switching unit to the service machine frame where the destination switching unit h is, send the information indicating that the destination switching access unit h can be reached to the first-level switching unit corresponding to the ith input link from the source service machine frame t, and when the second determining submodule 622' determines the value of Kt is greater than the output bandwidth from the second-level switching unit to the service machine frame where the destination switching unit h is, send the information indicating that the destination switching access unit h cannot be reached to the first-level switching unit corresponding to the ith input link, the (i+1)th input link, . . . , and the nth input link from the source service machine frame t.

Figure 9:
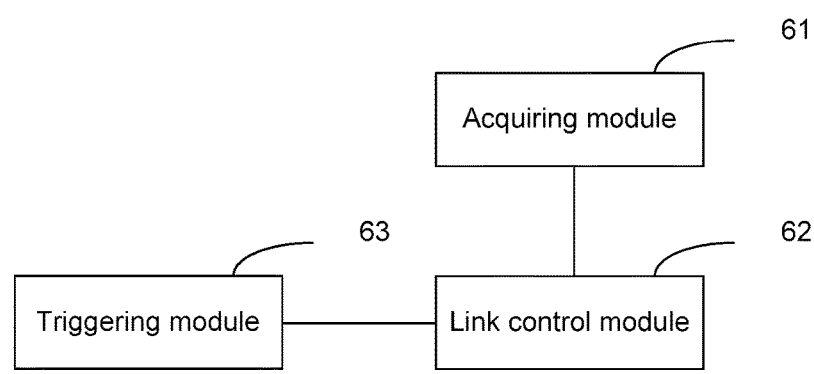
FIG. 9 is structure diagram illustrating another link control apparatus according to an embodiment of the disclosure.

In a specific embodiment, as shown in FIG. 9, the apparatus further includes a triggering module 63.

The triggering module 63 is arranged to trigger the link control module 62 to perform the link control by polling and/or when the output link of the switching unit fails.

The technical solutions of the disclosure are further elaborated below by means of the specific embodiments.

Embodiment 1

The embodiment of the disclosure solves the asymmetry problem of the second-level and third-level switching units by hierarchical processing. Regarding the asymmetry of the third-level switching unit in the service machine frame, with respect to each destination switching access unit, it is ensured that the total input bandwidth of the input links of the current switching unit is less than or equal to its total output bandwidth by sending the information indicating that the destination switching access unit cannot be reached. Regarding the asymmetry of the second-level switching unit in a central machine frame, all the service machine frames are regarded as a whole, and it is ensured for each destination switching access unit that the input bandwidth of each source service machine frame is less than or equal to the output bandwidth to the destination switching access unit.

Figure 10:
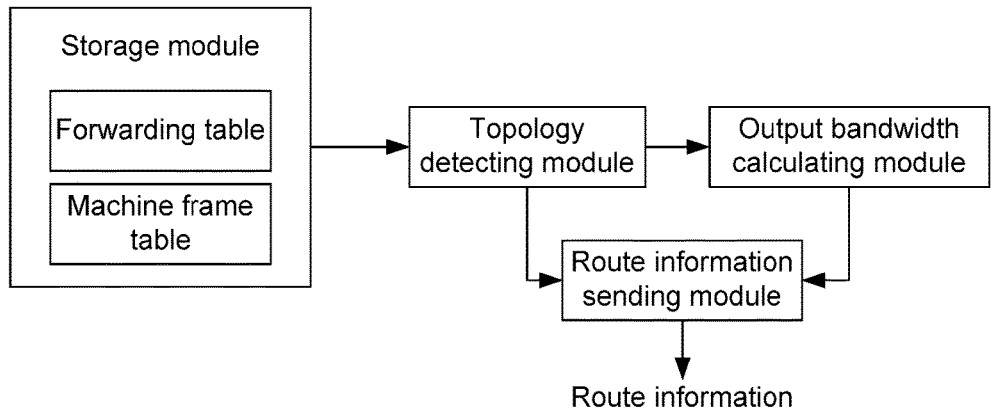
FIG. 10 is a structure diagram illustrating a processing apparatus of a three-level asymmetrical switching system in embodiment 1 of the disclosure.

In order to complete the above processing, the embodiment of the disclosure provides a processing apparatus of a three-level asymmetrical switching system, as shown in FIG. 10. The apparatus includes a storage module (which stores a forwarding table and a machine frame table), a topology information detecting module (which corresponds to the acquiring module 61), an output bandwidth calculating module (which corresponds to the first calculating submodule 621 and/or the second calculating submodule 621'), and a route information sending module (which corresponds to the first determining submodule 622 and the first sending submodule 623, and/or the second determining submodule 622' and the second sending submodule 623').

For the asymmetrical processing of the third-level switching unit of the service machine frame, the topology information detecting module is arranged to inquire the forwarding table, and acquire the connection relations and number of the input and output links.

The output bandwidth calculating module is arranged to calculate the total output bandwidth of the switching unit according to the connection relation and the link rate of each link acquired by inquiring the forwarding table and the machine frame table.

The route information sending module is arranged to, for each input link, accumulate and calculate the input bandwidth of the switching unit in order, when the input bandwidth is less than or equal to the total output bandwidth, send the information indicating that the destination switching access unit can be reached to the output link corresponding to the current input link, and when the input bandwidth is greater than the total output bandwidth, send the information indicating that the destination switching access unit cannot be reached to the output link corresponding to the current input link.

For the second-level switching unit on the central machine frame, similarly, the topology information detecting module is arranged to read the forwarding table and the machine frame table, and acquire the connection relations and number of the input and output links.

The output bandwidth calculating module is arranged to calculate the output bandwidth from the switching unit to the machine frame where the destination switching access unit is according to the connection relation and the link rate of each link acquired by inquiring the forwarding table and the machine frame table.

The route information sending module is arranged to, for each source service machine frame, accumulate in turn the bandwidth of each input link according to the connection relation and the link rate of each link acquired by inquiring the tables, and compare the bandwidth with the output bandwidth. The route information sending module is further arranged to send the information indicating that the destination switching access unit can be reached for the link whose input bandwidth is less than or equal to the output bandwidth, and send the information indicating that the destination switching access unit cannot be reached for the link whose input bandwidth is greater than the output bandwidth.

Embodiment 2

The present embodiment illustrates the link control for the third-level switching unit.

Figure 11:
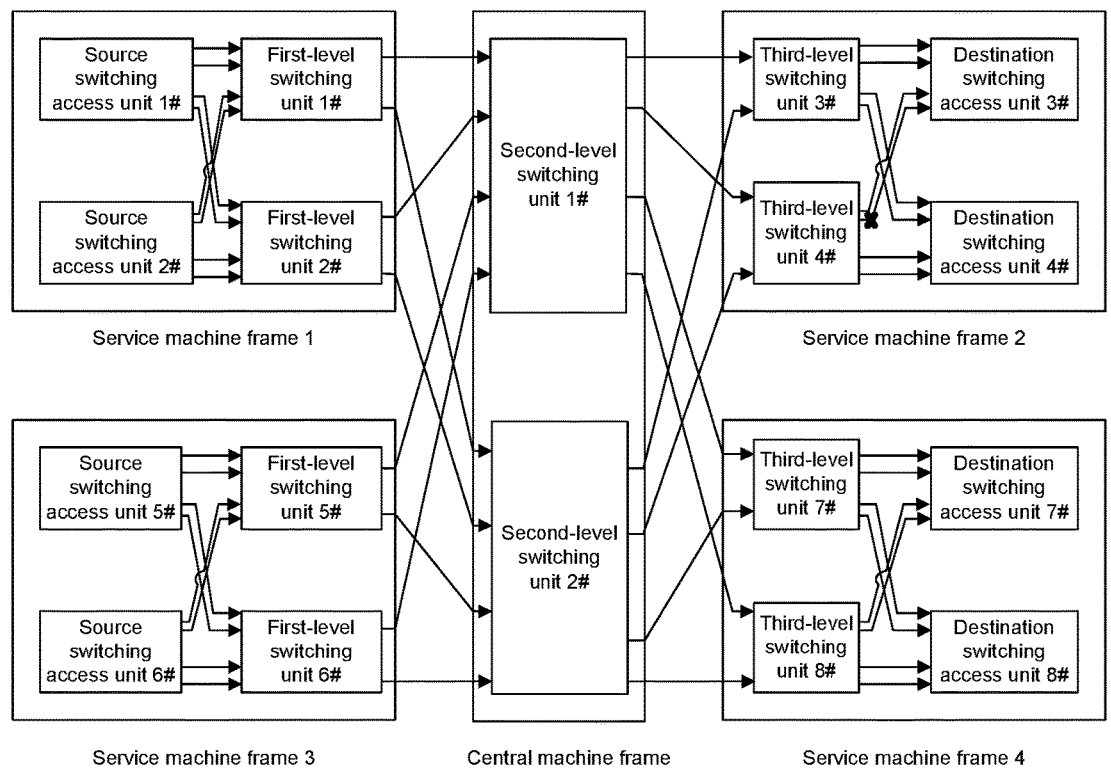
FIG. 11 is a structure diagram illustrating an asymmetrical switching system of a third-level switching unit in embodiment 2 of the disclosure.

FIG. 11 is a structure diagram illustrating an asymmetrical switching system of a third-level switching unit in embodiment 2 of the disclosure. As shown in FIG. 11, the system includes four service machine frames 1, 2, 3 and 4, and a central machine frame. There are two source switching access units or the destination switching access unit, and two first-level switching units or the third-level switching units on each of the service machine frames, and there are two second-level switching units on the central machine frame. In the implementation example, only the flows from the service machine frame 1 and the service machine frame 2 to the service machine frame 3 and the service machine frame 4 through the central machine frame are listed.

In each of the service machine frames, the switching access unit and the service switching unit are connected through two links, and the service switching unit and the second-level switching unit on the central machine frame are connected through two links. In this case, there is a link between the third switching unit 4# and the destination switching access unit 3# on the service machine frame 2 disconnected (as shown in FIG. 11). Thus, the asymmetry of the third-level switching unit appears in the switching system. On the service machine frame 2, for the destination switching access unit 3#, the input bandwidth of the third-level switching unit 4# is greater than the output bandwidth, and thus local congestion may occur here, thereby influencing the system performance.

At this point, the asymmetry of the third-level switching unit happens and the processing thereof is as follows.

At Step 001, on the third-level switching unit 4# on the service machine frame 2, the topology detecting module at first reads the forwarding table. The index in the forwarding table is the destination switching access unit, and the content therein is the number of a link through which the destination switching access unit can be reached and the link rate (namely the bandwidth). Accordingly, the number and total bandwidth of a reachable output link to a certain destination switching access unit can be acquired by reading the forwarding table.

At Step 002, the total output bandwidth of the switching unit is calculated from the first destination switching access unit, namely the destination switching access unit 3#, according to the number of the links through which the destination switching access unit can be reached and the rate of each link in the forwarding table. In FIG. 11, the third-level switching unit 4# has three output links, each of which has the same rate with the weight of one. Then, the output bandwidth from the third-level switching unit 4# to the reachable destination switching access unit 3# is 1, and the output bandwidth to the reachable destination switching access unit 3# is 2.

At Step 003, the third-level switching unit 4# has two input links each of which has the same rate with the weight of one. For the destination switching access unit 3#, when the two input links are polled, the accumulated input bandwidths are respectively 1 and 2. When the first input link is polled, the input bandwidth is 1, which is less than or equal to the output bandwidth to the reachable destination switching access unit 1#, so the third-level switching unit sends, through an internal bus to the first-level switching unit, information about a route that can reach the destination switching access unit 3# to the second-level switching unit in the central switching frame via the output link corresponding to the first input link. When the second input link is polled, the total input bandwidth of the two input links is greater than 1, so information about a route that cannot reach the destination switching access unit 3# is sent to the second-level switching unit in the central switching frame via the output link corresponding to the second input link.

At Step 004, for the destination switching access unit 4#, when two input links are polled, the accumulated input bandwidths are respectively 1 and 2. When the first input link is polled, the input bandwidth is 1, which is less than or equal to the output bandwidth to the reachable destination switching access unit 4#, and thus the information about the route that can reach the destination switching access unit 4# is sent to the second-level switching unit in the central switching frame via the output link corresponding to the first input link. When the second input link is polled, the total input bandwidth of the two input links is equal to 2, which is still less than or equal to the output bandwidth of the destination switching access unit 4#, so the information about the route that can reach the destination switching access unit 4# is sent to the second-level switching unit in the central switching frame via the output link corresponding to the second input link.

After the above processing, for the second-level switching unit 1# and the second-level switching unit 2# on the central machine frame, there are two output links that can reach the destination switching access unit 4# via the third-level switching unit 4#, and only one output link can reach the destination switching access unit 3# via the third-level switching unit 4#, so that the input and output bandwidths of the third-level switching unit 4# to the destination switching access unit 3# and the destination switching access unit 4# are kept consistent.

In the present embodiment, the third-level switching unit 4# is only interconnected with the destination switching access unit 3# and the destination switching access unit 4#. In practical application, if there are more destination switching access apparatuses, the above steps are repeated in turn. That is, the input and output bandwidths of the third-level switching unit are kept consistent for each of the destination switching access units.

Embodiment 3

The present embodiment illustrates the link control for the second-level switching unit.

Figure 12:
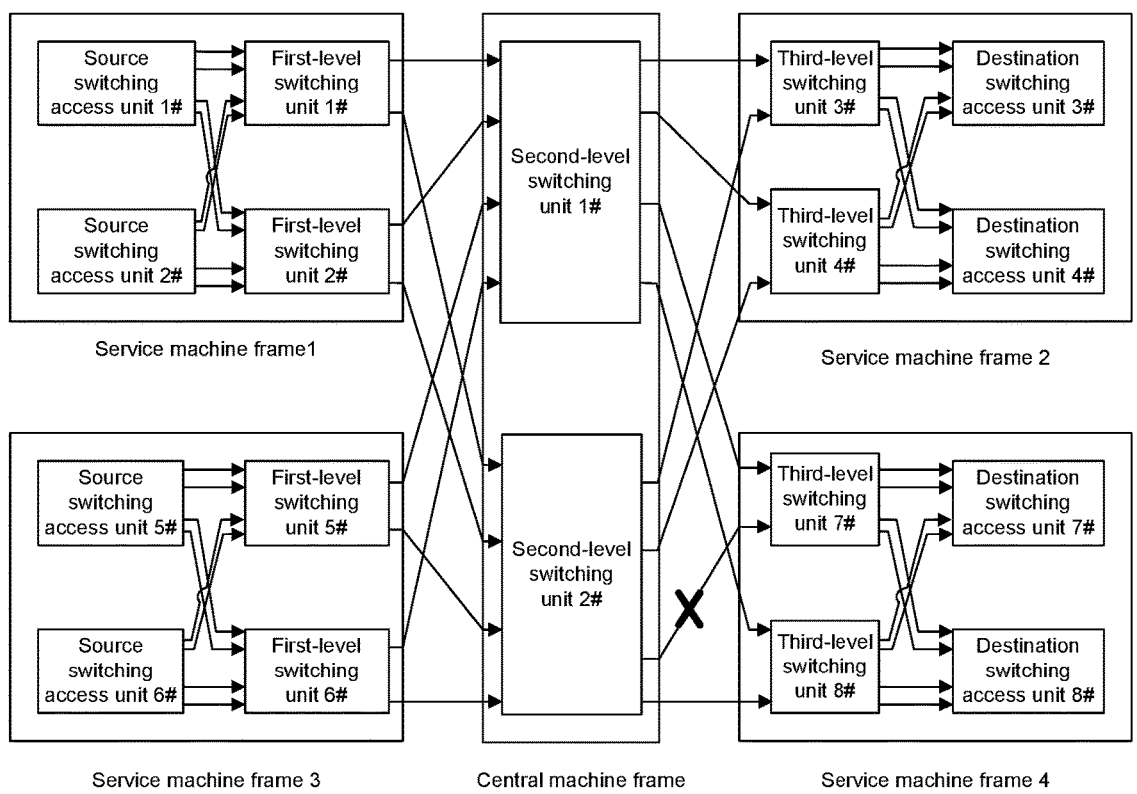
FIG. 12 is a schematic diagram illustrating an asymmetry scenario of a second-level switching unit in embodiment 3 of the disclosure.

The asymmetry scenario of the second-level switching unit is shown in FIG. 12. There is a high-speed serial link to interconnect the second-level switching unit 2# with the third-level switching unit 7# and the third-level switching unit 8#, respectively. However, due to link abnormity and other reasons, a link between the second-level switching unit 2# and the third-level switching unit 7# is disconnected, and there is a link between the second-level switching unit 2# and the third-level switching unit 8# interconnected. Thus, there is only one link for the second-level switching unit 2# to reach the destination switching access unit 7# and the destination switching access unit 8# via the third-level switching unit 8#. In such a case, the processing steps are as follows.

At Step 001, in the second-level switching unit 2# on the central machine frame, the topology detecting module detects and reads the forwarding table and the machine frame table to acquire the connection relations. The index in the forwarding table is the destination switching access unit, and the content is the number of the link through which the destination switching access unit can be reached and the link rate (namely the bandwidth). The machine frame table is used for indicating which service machine frame a certain link is interconnected with, and its index is a service machine frame number, and the content is the corresponding input link number and the link rate (namely the bandwidth) of the link which the service machine frame is interconnected with.

At Step 002, the second-level switching unit 2# calculates the output bandwidth reaching a destination service machine frame where the destination switching access unit is according to the connection relation and the link rate of each link from the switching access unit 7#. Similarly, the bandwidth weights of the input and output links of the second-level switching unit 2# are both set 1. The second-level switching unit 2# can reach, through only one link, the destination switching access unit 3# via the third-level switching unit 8#, so the output bandwidth to the destination switching access unit 7# in the second-level switching unit 2# is 1.

At Step 003, from the source service machine frame 1, according to the machine frame table, the service machine frame 1 and the second-level switching unit 2# have two links interconnected. Each link accumulates and calculates the input bandwidth from the service machine frame 1 to the destination switching access unit 7#, and compares it with the output bandwidth. Because the service machine frame 1 and the second-level switching unit 2# have two links interconnected, the information about the route that can reach the destination switching access unit 7# is sent to the output link corresponding to the first link. After receiving the information, the third-level switching unit 1# in the service machine frame 1 sends it to the corresponding first-level switching unit 1# of the service machine frame 1 through the internal bus. The information about the route that cannot reach the destination switching access unit 7# is sent to the output link corresponding to the second link. After receiving the information, the third-level switching unit 2# in the service machine frame 1 sends it to the first-level switching unit 2# in the service machine frame 1 through the internal bus.

At Step 004, when the source service machine frame 3 is polled, the operation of Step 003 is repeated. Thus, it is also realized that one output link of the first-level switching access unit 5# in the service machine frame 3 can reach a destination switching interface 7#, and one output link of the first-level switching access unit 6# cannot reach the destination switching interface 7#.

At Step 005, for the next destination switching access unit 8#, the operations from Step 002 to Step 004 are repeated.

By means of the processing at the second-level switching unit 2#, it is realized that each of the service frames has only one input link that can reach the destination switching access unit 7# and the destination switching access unit 8# via one link, and the consistency of bandwidths of the input link and the output link is realized, which solves the problem of local congestion. When there are more destination switching access units in the system, the same way can be adopted to implement the processing of asymmetry.

It can be seen from the above description that use of the method and apparatus of the disclosure ensures that input bandwidths of the second-level and third-level switching units are less than or equal to the output bandwidth for each destination switching access unit, solves the problem of local congestion, and improves the stability of the system.

The above modules can be realized by a Central Processing Unit (CPU), a Digital signal Processor (DSP) or a Field-Programmable Gate Array (FPGA) in an electronic apparatus.

Those skilled in the art should appreciate that the embodiments of the disclosure can be provided as a method, a system or a computer program product. Accordingly, this disclosure can adopt hardware, software, or a combination thereof. Besides, this disclosure can adopt the form of a computer program product which is implemented on one or more computer available storage media including computer available program codes, wherein the storage media include, but are not limited to, a magnetic disk memory and an optical memory, and so on.

This disclosure is described according to the flowcharts and/or block diagrams of the method, the apparatus (system) and the computer program product in the embodiments of this disclosure. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the apparatus which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction apparatus, wherein the instruction apparatus implements the specified functions in one or more flows of the flowchart and/or one or more blocks of the block diagram.

These computer program instructions can also be loaded on the computer or other programmable data processing equipment, so that a series of operation steps are performed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

The above is only the preferred embodiments of the disclosure and not intended to limit the scope of the disclosure.

INDUSTRIAL APPLICABILITY

According to a link control method and apparatus provided by the disclosure, the link information and/or machine frame information in the system is acquired, and the link control is performed according to the acquired link information and/or machine frame information. According to the technical solutions described in the disclosure, the problems of local congestion and packet loss in a three-level asymmetrical switching system can be effectively solved, the traffic level of the system is ensured, and the performance of the system is improved.

The invention claimed is:

1. A link control method, applied to a three-level switching system of a packet switching apparatus, comprising:
   acquiring at least one of link information or machine frame information in the three-level switching system; and
   performing link control according to the at least one of the link information or machine frame information;
   wherein for a third-level switching unit of the three-level switching system, acquiring the at least one of the link information or machine frame information in the three-level switching system comprises:
  acquiring connection relations and link rates of input links of the third-level switching unit, and connection relations and link rates of output links of the third-level switching unit;
performing the link control according to the at least one of the link information or machine frame information comprises:
  calculating a current input bandwidth value K according to K=K+Ki, wherein an initial value of K is 0, Ki is a link rate of an ith input link of the third-level switching unit, wherein i=1, 2, ..., n, and n is the number of input links of the third-level switching unit; and
  determining whether the value of K is not greater than a total output bandwidth of the third-level switching unit; if the value of K is not greater than the total output bandwidth of the third-level switching unit, sending information indicating that a destination switching access unit can be reached to a second-level switching unit of the three-level switching system corresponding to the ith input link, making i=i+1, recalculating the value of K, and continuing to determine whether the value of K is not greater than the total output bandwidth of the third-level switching unit, and repeating the above steps; if the value of K is greater than the total output bandwidth of the third-level switching unit, sending information indicating that the destination switching access unit cannot be reached to the second-level switching unit corresponding to the ith input link, an (i+1)th input link, ..., and an nth input link, respectively, wherein the total output bandwidth of the third-level switching unit is a sum of link rates of all output links of the third-level switching unit.

2. The method according to claim 1, wherein, for the second-level switching unit,
  acquiring the at least one of the link information or machine frame information in the three-level switching system comprises:
    acquiring connection relations and link rates of input links of the second-level switching unit, connection relations and link rates of output links of the second-level switching unit, and composition of service machine frames in link connection with the second-level switching unit;
  performing the link control according to the at least one of the link information or machine frame information comprises:
    calculating an input bandwidth value Kt from a source service machine frame t according to Kt=Kt+Kti, wherein an initial value of Kt is 0, Kti is a link rate of an ith input link in the second-level switching unit from the source service machine frame t, wherein i=1, 2, ..., n, t=1, 2, ..., m, n is the number of input links in the second-level switching unit from the source service machine frame t, and m is the number of source service machine frames in link connection with the second-level switching unit;
    determining whether the value of Kt is not greater than an output bandwidth from the second-level switching unit to a service machine frame where a destination switching unit h is; if the value of Kt is not greater than the output bandwidth from the second-level switching unit to the service machine frame where the destination switching unit h is, sending information indicating that the destination switching access unit h can be reached to a first-level switching unit corresponding to the ith input link from the source service machine frame t, making i=i+1, recalculating the value of K, continuing to determine whether the value of Kt is not greater than the output bandwidth from the second-level switching unit to the service machine frame where the destination switching unit h is, repeating the above steps; if the value of Kt is greater than the output bandwidth from the second-level switching unit to the service machine frame where the destination switching unit h is, sending information indicating that the destination switching access unit h cannot be reached to the first-level switching unit corresponding to the ith input link, an (i+1)th input link, ..., and an nth input link from the source service machine frame t, after traversing all input links from the source service machine frame t, making t=t+1, i=1, recalculating the value of Kt, and continuing to determine whether the value of Kt is not greater than the output bandwidth from the second-level switching unit to the service machine frame where the destination switching unit h is, wherein the output bandwidth from the second-level switching unit to the service machine frame where the destination switching unit h is refers to a sum of link rates of all output links from the second-level switching unit to the destination switching unit h; and
    after traversing all source service machine frames in link connection with the second-level switching unit, making h=h+1, t=1, and i=1, repeating the above steps so as to perform the link control.

3. The method according to claim 2, wherein performing the link control according to the at least one of the link information or machine frame information comprises:
  performing the link control for a switching unit by at least one of polling or according to the at least one of the link information or machine frame information when an output link of the switching unit fails.

4. The method according to claim 1, wherein performing the link control according to the at least one of the link information or machine frame information comprises:
  performing the link control for a switching unit by at least one of polling or according to the at least one of the link information or machine frame information when an output link of the switching unit fails.

5. A link control apparatus, applied to a three-level switching system of a packet switching apparatus, comprising a processor and a memory storing instructions that, when executed by the processor, cause the processor to:
  acquire at least one of link information or machine frame information in the three-level switching system; and
  perform link control according to the at least one of the link information or machine frame information;
  wherein the instructions, when executed by the processor, cause the processor further to:
    acquire connection relations and link rates of input links of a third-level switching unit, and connection relations and link rates of output links of the third-level switching unit;
    calculate a current input bandwidth value K according to K=K+Ki, wherein an initial value of K is 0, Ki is a link rate of an ith input link of the third-level switching unit, wherein i=1, 2, . . . , n, and n is the number of input links of the third-level switching unit; determine i=i+1 again according to a notification, and recalculate the value of K;

determine whether the value of K is not greater than a total output bandwidth of the third-level switching unit, wherein the total output bandwidth of the third-level switching unit is a sum of link rates of all output links of the third-level switching unit; and when it is determined that the value of K is not greater than the total output bandwidth of the third-level switching unit, send information indicating that a destination switching access unit can be reached to a second-level switching unit corresponding to the ith input link; when it is determined that the value of K is greater than the total output bandwidth of the third-level switching unit, send information indicating that the destination switching access unit cannot be reached to the second-level switching unit corresponding to the ith input link, an (i+1)th input link, . . . , and an nth input link.

6. The apparatus according to claim 5, wherein the instructions, when executed by the processor, cause the processor further to acquire connection relations and link rates of input links of a second-level switching unit, connection relations and link rates of output links of the second-level switching unit, and composition of service machine frames in link connection with the second-level switching unit;

calculate an input bandwidth value Kt from a source service machine frame t according to Kt=Kt+Kti, wherein an initial value of Kt is 0, Kti is a link rate of an ith input link in the second-level switching unit from the source service machine frame t, wherein i=1, 2, . . . , n, t=1, 2, . . . , m, n is the number of input links in the second-level switching unit from the source service machine frame t, and m is the number of source service machine frames in link connection with the second-level switching unit; after information indicating that a destination switching access unit h can be reached is sent to a first-level switching unit corresponding to the ith input link from the source service machine frame t, make i=i+1, recalculate the value of Kt, and after traversing all input links from the source service machine frame t, make t=t+1, i=1, recalculate the value of Kt, and after traversing all source service machine frames in link connection with the second-level switching unit, make h=h+1, t=1, and i=1, and recalculate the value of Kt;

determine whether the value of Kt calculated is not greater than an output bandwidth from the second-level switching unit to a service machine frame where a destination switching unit h is; wherein the output bandwidth from the second-level switching unit to the service machine frame where the destination switching unit h is refers to a sum of link rates of all output links from the second-level switching unit to the destination switching unit h; and when it is determined that the value of Kt is not greater than the output bandwidth from the second-level switching unit to the service machine frame where the destination switching unit h is, send information indicating the destination switching access unit h can be reached to the first-level switching unit corresponding to the ith input link from the source service machine frame t, and when it is determined that the value of Kt is greater than the output bandwidth from the second-level switching unit to the service machine frame where the destination switching unit h is, send information indicating that the destination switching access unit h cannot be reached to the first-level switching unit corresponding to the ith input link, an (i+1)th input link, . . . , and an nth input link from the source service machine frame t.

7. The apparatus according to claim 5, wherein the instructions, when executed by the processor, cause the processor further to trigger to perform the link control by at least one of polling or when an output link of a switching unit fails.

8. The apparatus according to claim 6, wherein the instructions, when executed by the processor, cause the processor further to trigger to perform the link control by at least one of polling or when an output link of a switching unit fails.

* * * * *